United States Patent
Watanabe et al.

(10) Patent No.: US 6,737,380 B2
(45) Date of Patent: May 18, 2004

(54) SOLID ACID CATALYST, PRODUCTION METHOD THEREOF, AND METHOD FOR HYDRODESULFURIZING AND ISOMERIZING LIGHT HYDROCARBON OIL USING THE SAME

(75) Inventors: Katsuya Watanabe, Saitama (JP); Takahito Kawakami, Saitama (JP); Koji Baba, Saitama (JP); Takao Kimura, Saitama (JP)

(73) Assignees: Petroleum Energy Center, Tokyo (JP); Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 10/059,021

(22) Filed: Jan. 30, 2002

(65) Prior Publication Data

US 2003/0010679 A1 Jan. 16, 2003

Related U.S. Application Data

(60) Provisional application No. 60/331,992, filed on Nov. 23, 2001.

(30) Foreign Application Priority Data

Feb. 5, 2001 (JP) .................................... P. 2001-027805

(51) Int. Cl.[7] ...................... B01J 27/053; B01J 24/043; B01J 23/00; C01B 17/96; C01G 25/02

(52) U.S. Cl. ...................... 502/217; 502/222; 502/223; 502/325; 502/349; 423/544; 423/545; 423/608; 423/625

(58) Field of Search ................. 502/217, 222, 502/223, 325, 349; 423/608, 625, 544, 545

(56) References Cited

U.S. PATENT DOCUMENTS 6,107,235 A * 8/2000 Matsuzawa ................. 502/217
6,326,328 B1 * 12/2001 Matsuzawa ................. 502/217
6,420,305 B1 * 7/2002 Matsuzawa et al. ........ 502/222

* cited by examiner

Primary Examiner—C. Melissa Koslow
Assistant Examiner—Patricia L. Hailey
(74) Attorney, Agent, or Firm—Sughrue Mion, PLLC

(57) ABSTRACT

A process for producing a solid acid catalyst, which comprises: adding a pseudoboehmite as a binder to a sulfated zirconium hydroxide, followed by kneading with an aqueous solution containing at least one metal of the Group VIII, or loading at least one metal of the Group VIII on a sulfated zirconium hydroxide, and then adding a pseudoboehmite as a binder thereto, followed by kneading with water, further followed by molding and calcining at a temperature of from 550 to 800° C.; a solid acid catalyst produced by the production process; and a method for hydrodesulfurizing and isomerizing a light hydrocarbon oil using the catalyst.

6 Claims, No Drawings

SOLID ACID CATALYST, PRODUCTION METHOD THEREOF, AND METHOD FOR HYDRODESULFURIZING AND ISOMERIZING LIGHT HYDROCARBON OIL USING THE SAME

CROSS REFERENCE TO RELATED APPLICATIONS

This application claims benefit and priority from U.S. Provisional Application No. 60/331,992, filed Nov. 23, 2001.

FIELD OF THE INVENTION

The present invention relates to a solid acid catalyst and a process for producing the same. More particularly, the present invention relates to a sulfate group-containing zirconia-alumina catalyst having loaded thereon a metal of the Group VIII which is suitable for industrial use, and to a process for producing the same. Also, the present invention relates to a method for hydrodesulfurizing and isomerizing a light hydrocarbon oil which is conducted using the catalyst.

BACKGROUND OF THE INVENTION

Solid acid catalysts, in particular, sulfate group-containing zirconia catalysts and having loaded thereon a metal of the Group VIII, are used for the isomerization or alkylation of hydrocarbons. Solid acid catalysts for industrial use including these catalysts should not only have high catalytic activity but also have strength to some extent so as not to be broken by their own weight when packed into reactors. Because of this, a technique which has hitherto been used frequently is to press a powdery solid acid catalyst as it is into tablets or mold the catalyst into columnar, four-cusped, spherical, particulate, or other shapes with an appropriate binder before the catalyst is packed into a reactor and used.

However, the tablet catalyst obtained by mere press forming is apt to break during the operation of the practical apparatus because it is a mere powder compact. In addition, since the tablets are not a porous material, inner parts of the catalyst cannot be utilized as a reaction field. Namely, the area of contact with reactants is small and this catalyst has low activity.

The technique using a binder for molding is effective in obtaining a porous catalyst having a high contact efficiency. However, since some degree of binder amount is necessary for securing a certain strength, the binder, when added in a large amount, reduces the concentration of the solid acid in the molded catalyst, resulting in reduced catalytic activity. Furthermore, there are cases where the binder itself deactivates active sites present on the catalyst surface to reduce the catalytic performance.

Examples of the proposed techniques using a binder include processes for producing a catalyst which comprise mixing zirconium hydroxide or zirconia with boehmite-state alumina as a binder and molding the mixture (JP-A-9-38494 and JP-A-11-57478). Although these processes can yield a porous catalyst having a high contact efficiency, the side crush strength of the catalyst cannot be sufficiently enhanced because the binding strength between the alumina as a binder and the zirconium hydroxide or zirconia as a raw material is low. Although increasing the amount of the alumina to be mixed as a binder is necessary for heightening the side crush strength, this results in an increase in the proportion of the alumina in the molded catalyst. Namely, the catalyst thus obtained has a low solid-acid content, i.e., low activity.

Another process comprises calcining zirconium hydroxide or zirconia having loaded thereon a sulfate group, and subsequently adding alumina as a binder thereto, followed by molding. However, the catalyst produced by this process has extremely low solid acidity because the alumina covers the sulfate group, and cannot hence be used as a practical catalyst.

Under these circumstances, how to produce a molded solid acid catalyst having a high side crush strength, a small binder amount, and hence high solid acidity from a powdery solid acid catalyst has been a subject of study in this field.

SUMMARY OF THE INVENTION

An object of the present invention is to provide a process for producing a solid acid catalyst which has a high side crush strength and retains the inherent solid acidity even though it is a molded catalyst.

Another object of the present invention is to provide a method of hydrodesulfurization and isomerization by which the desulfurization and isomerization of an organosulfur compound-containing light hydrocarbon oil can be simultaneously attained with the solid acid catalyst produced by the process.

These and other objects of the present invention have been accomplished by a process for producing a solid acid catalyst, which comprises:

(A) subjecting a zirconium hydroxide to a sulfation treatment by adding a sulfate group-containing substance;

($B_1$) adding a pseudoboehmite as a binder to the sulfated zirconium hydroxide, followed by kneading with an aqueous solution containing at least one metal of the Group VIII;

(C) molding the resulting kneaded mixture; and (D) calcining the resulting molding at a temperature of from 550 to 800° C.

Furthermore, these and other objects of the present invention have been accomplished also by a process for producing a solid acid catalyst, which comprises:

(A) subjecting a zirconium hydroxide to a sulfation treatment by adding a sulfate group-containing substance;

($B_2$) loading at least one metal of the Group VIII on the sulfated zirconium hydroxide, and then adding a pseudoboehmite as a binder thereto, followed by kneading with water;

(C) molding the resulting kneaded mixture; and (D) burning the resulting molding at a temperature of from 550 to 800° C.

Moreover, these and other objects of the present invention have been accomplished with a solid acid catalyst, which is produced by any of the above processes, and has a specific surface area of from 50 to 200 $m^2/g$, a total pore volume of from 0.05 to 0.5 mL/g, and a side crush strength of 0.3 kg/2 mm or higher.

Also, these and other objects of the present invention have been accomplished with a method for the hydrodesulfurization and isomerization of a light hydrocarbon oil, which comprises bringing a light hydrocarbon oil having a sulfur content of 700 ppm by weight or lower and hydrogen into contact with the above catalyst under reaction conditions at a temperature of from 160 to 240° C., a pressure of from 1.0 to 4.5 MPa, an LHSV of from 1.0 to 10 $h^{-1}$, and a hydrogen/oil ratio of from 100 to 1,000 NL/L.

DETAILED DESCRIPTION OF THE INVENTION

The present inventors made intensive investigations in order to overcome the drawbacks of the known techniques described above. As a result, it has been found that for producing a solid acid catalyst without adversely influencing the catalytic activity which should be inherent therein, it is essential that sulfate group-containing zirconium hydroxide is prepared first and catalyst production is carried out using the zirconium hydroxide as a starting material. It has further been found that a catalyst combining a high side crush strength and high activity in hydrodesulfurization and isomerization is obtained by using the sulfate group-containing zirconium hydroxide in the uncalcined state as a molding material and by adding a pseudoboehmite as a binder, followed by kneading, and calcining the kneaded mixture at from 550 to 800° C. The present invention has been thus completed.

The constituent elements of the present invention will be explained below.

Zirconium Hydroxide:

The zirconium hydroxide to be used in the present invention may be not only a hydroxide of zirconium but a partially oxidized hydroxide. Consequently, the term "zirconium hydroxide" or "hydroxide of zirconium" will be used in the following description as a representative of both. Zirconium hydroxide exists in several forms including $Zr(OH)_4$, $Zr(OH)_2$, $Zr(OH)_3$ and $ZrO(OH)_2$, and any of these can be used. $Zr(OH)_4$ and $ZrO(OH)_2$ are preferred. The zirconium hydroxides may be hydrates. Zirconium hydroxides which are commercially available may be used. It is possible according to need to produce a zirconium hydroxide by a known method, e.g., a method in which a solution of a water-soluble salt of zirconium is made alkaline to thereby precipitate the hydroxide.

Sulfating Agent and Amount of Sulfate Group:

One feature of the present invention resides in that a sulfation treatment for incorporating a sulfate group into a zirconium hydroxide is conducted before the catalyst production proceeds. Examples of the treating agent which gives a sulfate group include sulfuric acid, ammonium sulfate, sulfurous acid, ammonium sulfite, hydrogen sulfide, sulfurous acid gas and the like. Sulfuric acid and ammonium sulfate are preferred. The amount of the sulfate group to be incorporated is from 0.1 to 10% by weight, preferably from 0.5 to 5% by weight, in terms of sulfur (S) amount. By regulating the amount of the sulfate group to 0.1% by weight or larger in terms of sulfur amount, a catalyst containing a sufficient solid acid and having sufficient catalytic activity can be obtained as a product. On the other hand, by regulating the amount thereof to 10% by weight or smaller, the zirconia surface can be prevented from being covered with sulfur and high catalytic activity can be obtained. Moreover, sulfuric acid is prevented from flowing out during catalyst production, whereby the apparatus can be prevented from suffering corrosion and the like.

Methods of Sulfation Treatment:

Various methods can be used for the sulfation treatment. Examples thereof generally include an adsorption method, an impregnation method, and a mixing method.

The adsorption method is a method in which a liquid or solid sulfating agent is dissolved in a 1- to 10-fold amount of water and the solution is adsorbed onto a zirconium hydroxide. For example, a zirconium hydroxide is placed in an aqueous solution of a treating agent, followed by stirring to adsorb the treating agent. Thereafter, the excess aqueous solution of the treating agent can be removed by filtration. The sulfate group-containing zirconium hydroxide obtained through filtration may be dried or not. The amount of the sulfate group to be incorporated can be controlled by regulating the amount of the sulfating agent to be dissolved in water, the time period of adsorption operation, and the like.

The impregnation method is a method in which a solid or liquid sulfating agent is dissolved in a solvent and a zirconium hydroxide is impregnated with this solution to thereby obtain a sulfate group-containing zirconium hydroxide.

The mixing method is a method employed when a solid sulfating agent is to be incorporated into a zirconium hydroxide.

Provision of Group VIII Metals:

Examples of the Group VIII (Groups 8 to 10) metal components include platinum, palladium, ruthenium, iridium, nickel, cobalt and the like. Preferred are platinum, palladium and ruthenium. The Group VIII metals may be loaded alone or as a mixture of two or more thereof.

Examples of techniques for loading such Group VIII metal components include: a technique which may be called a simultaneous kneading method and comprises adding an aqueous solution containing one or more of these metals to the zirconium hydroxide which has been sulfated in the manner described above and a binder and kneading the resulting mixture ($B_1$); and a technique which may be called a metal-loading method before kneading and comprises first loading one or more of those metals on the sulfated zirconium hydroxide, and then adding a binder thereto, followed by kneading with water ($B_2$).

In the simultaneous kneading method, the Group VIII metal components are added in the form of various water-soluble salts thereof, such as chloride, bromide, iodide, sulfate, nitrate, amine complex and the like. When apparatus corrosion is taken in account, it is preferred to use an amine complex which is not acidic.

In the metal-loading method before kneading, there are no particular limitations on methods for loading Group VIII metal components. However, typical methods are the impregnation method and ion-exchange method, which are well known to persons skilled in the art. In short, any method may be used as long as the metals can be evenly loaded with high dispersion on the sulfate group-containing zirconium hydroxide. The metal compounds to be loaded may be any of the various water-soluble salts enumerated above.

Regardless of which of the metal-loading methods described above has been selected, the amount of the Group VIII metals is regulated so that the proportion thereof in the solid acid catalyst finally obtained is from 0.05 to 10% by weight, preferably from 0.05 to 5% by weight. By regulating the amount thereof to 0.05% by weight or larger, the performance of solid acid catalysts having a noble metal ingredient can be sufficiently obtained. On the other hand, by regulating the amount thereof to 10% by weight or smaller, a high degree of dispersion of the metal components can be maintained and high catalytic performance is obtained.

Binder:

Among aluminas, one having a pseudoboehmite structure is used in the present invention because it is optimal. Pseudoboehmites are generally available in the form of a powder or as a dispersion in a liquid, i.e., in a sol form, and have a structure $(AlOOH)_n$ formed by lowly polymerizing aluminum hydroxide (n is a number larger than 1). The pseudoboehmites on the market are in such a state that the surface of the particles has been stabilized with monovalent negative charges such as acetate ions or chlorine ions so as to inhibit further polymerization and a resulting increase in molecular weight. In the present invention, the pseudoboehmite changes in crystal form upon calcining in a later step and finally becomes γ-alumina or ↓-alumina. However, in case where γ-alumina or α-alumina, for example, is employed as the binder used initially, the catalyst side crush strength cannot be enhanced and a practical catalyst cannot be obtained.

This difference is attributable to the fact that the particles of an alumina having a pseudoboehmite structure have been positively charged and hence tenaciously bind to the sulfate group-containing zirconium hydroxide used as a starting material for catalyst production. The surface of the particles of the sulfate group-containing zirconium hydroxide has been negatively charged by the sulfuric acid and can hence bind to positive charges of the alumina. This binding is thought to bring about a high side crush strength. In contrast, γ-alumina, α-alumina and the like are thought to be deficient in surface positive charges and hence unable to tenaciously bind to the sulfate group-containing zirconium hydroxide and, as a result, unable to realize the side crush strength practically required of catalysts.

Catalyst Production-Procedure:

As described above, there are two embodiments of procedure for solid acid catalyst production in the present invention, i.e., one in which the sulfate group-containing zirconium hydroxide and a binder are kneaded together with an aqueous solution containing at least one metal of the Group VIII ($B_1$) and one in which the sulfate group-containing zirconium hydroxide to which at least one metal of the Group VIII has been loaded beforehand is kneaded together with a binder and water ($B_2$). Subsequently, the mixture obtained through kneading is molded into a catalyst form and stabilized by calcining at a temperature of from 550 to 800° C.

Catalyst Production-Kneading:

For kneading the raw catalyst materials in practicing the present invention, any kneader may be used as long as it is generally used for catalyst production. In the embodiment ($B_1$) described above, the sulfate group-containing zirconium hydroxide and a binder are mixed with each other and stirred, and then kneaded while adding thereto an aqueous solution containing at least one metal of the Group VIII. In the embodiment ($B_2$) described above, the sulfate group-containing zirconium hydroxide having loaded thereon at least one metal of the Group VIII is mixed with a binder and stirred, and water is then added thereto, followed by kneading.

For the kneading, various solvents can be used alone or as a mixture of two or more thereof. The solvents include alcohol organic solvents such as methanol, ethanol, etc., acid solvents such as sulfuric acid, dilute sulfuric acid, nitric acid, hydrochloric acid, acetic acid, etc., and the like. However, water is usually sufficient and is preferred.

The proportion of the sulfate group-containing zirconium hydroxide to the binder or the proportion of the sulfate group-containing zirconium hydroxide having loaded thereon at least one metal of the Group VIII to the binder is preferably regulated so that the zirconium oxide/alumina ratio is from 97/3 to 80/20 (unit: % by weight) in terms of the proportions of the oxides in the solid acid catalyst finally obtained. By regulating the amount of alumina to 3% by weight or larger, a sufficient binding strength is obtained and the side crush strength required of catalysts is realized. On the other hand, by regulating the amount of alumina to 20% by weight or smaller, the side crush strength of the catalyst is enhanced and the relative amount of the sulfate group-containing zirconium hydroxide can be sufficient to secure a necessary solid acid amount. The especially preferred range is from 95/5 to 85/15.

Catalyst Production-Molding:

The mixture obtained by kneading the sulfate group-containing zirconium hydroxide and a binder together with an aqueous solution containing at least one metal of the Group VIII and the mixture obtained by kneading the sulfate group-containing zirconium hydroxide having loaded thereon at least one metal of the Group VIII and a binder together with an aqueous medium can be molded into a catalyst form by a technique known to persons skilled in the art. Examples of the molding technique include an extrusion molding method, a rolling granulation method, a dropping-into-oil method and the like. The extrusion molding method is preferred. The molded form is not particularly limited in size/shape, and examples include columnar, four-cusped, spherical and granular shapes and the like. It is generally preferred to mold the catalyst so as to have a section having a diameter of from 1 to 5 mm. Especially when an extrusion-molded product having a cylindrical, four-cusped or similar contour is to be produced, the molding technique can easily give a catalyst having a length of about from 1 to 20 mm and is practically advantageous.

Catalyst Production-Another Possible Procedure of Catalyst Production:

Another method for catalyst molding comprises kneading the sulfate group-containing zirconium hydroxide and a binder together with water, extrusion-molding the resulting mixture, drying the molding, and then impregnating it with an aqueous solution containing at least one metal of the Group VIII. The method also can give a precursor which upon burning becomes a catalyst. However, a larger number of production steps are necessary and this results in an increased catalyst production cost, which makes the method disadvantageous.

Catalyst Production-Timing of Calcination:

In the process for catalyst production of the present invention, it is important that the molded form obtained by molding the kneading product comprising the sulfate group-containing zirconium hydroxide having loaded thereon at least one metal of the Group VIII be finally calcined at an appropriate temperature. The reason for this is that the stabilization by calcination of the molded form described above converts the zirconium hydroxide into zirconium oxide (zirconia) to give a sulfate group-containing zirconia having calcined thereon at least one metal of the Group VIII and this zirconia exhibits high performance as a catalyst.

In some production processes of the related art, a material which has been converted to zirconia through calcination is used as a starting material for a catalyst. However, since this starting material already has strong solid acidity due to the calcination, the binding between the pseudoboehmite gel as a binder and the sulfate group on the zirconia is so strong that all sulfate groups are covered with aluminum. The catalyst in this state does not exhibit its solid acidity although it contains a sulfate group. This product does not function as a solid acid catalyst.

Catalyst Production-Calcining Conditions:

The form obtained by molding, which should be called a catalyst precursor, is dried and then calcined for the stabilization of the solid acid. In the "stabilization", the catalyst precursor is calcined to cause dehydrating condensation of the zirconium hydroxide to thereby crystallize it into zirconium oxide. The calcination for this stabilization is conducted by heating the precursor in an oxidizing atmosphere at a temperature in the range of from 550 to 800° C., preferably from 600 to 750° C., for from 0.5 to 10 hours. By regulating the calcining temperature to 550° C. or higher, the catalyst is stabilized and comes to have solid acidity. On the other hand, by regulating the temperature to 800° C. or lower, the sulfate group incorporated is prevented from volatilizing and a catalyst showing solid acidity can be obtained.

Sulfur Content in the Catalyst:

The sulfur concentration in the final catalyst varies slightly depending on the temperature and period of calcination, but is in the range of preferably from 0.1 to 5% by weight, more preferably from 0.5 to 4% by weight. By regulating the sulfur concentration to 0.1% by weight or higher, the catalyst can be made to sufficiently function as a solid acid catalyst and have sufficient activity. On the other hand, by regulating the concentration thereof to 5% by weight or lower, the sulfate group can be prevented from excessively covering the zirconia surface and accumulating on the surface to deactivate active sites.

The sulfur content in the catalyst is measured, for example, by burning a sample in an oxygen stream to oxidize the sulfur (S) contained in the sample and thereby convert it into sulfurous acid gas ($SO_2$), removing the water and dust, and then detecting the $SO_2$ with an infrared detector, e.g., a solid-state detector. According to this analytical method, sulfur contents in samples in the range of from 0.001 to 99.99% can be determined.

Properties of the Catalyst:

The catalyst obtained by the processes of the present invention preferably has a specific surface area in the range of from 50 to 200 $m^2/g$, especially from 60 to 180 $m^2/g$, after the stabilization by calcination. By regulating the specific surface area to 50 $m^2/g$ or larger, the Group VIII metals are dispersed in a higher degree to give a larger area of contact with reactants. Consequently, the catalyst can be utilized as an excellent solid acid catalyst. On the other hand, by regulating the specific surface area to 200 $m^2/g$ or smaller, a catalyst having solid acidity and a high strength can be obtained.

The catalyst obtained by the processes of the present invention preferably has a total pore volume of from 0.05 to 0.5 mL/g, more preferably from 0.1 to 0.4 mL/g, after the stabilization by calcination. By regulating the total pore volume to 0.05 mL/g or greater, reactants can be diffused into inner parts of the catalyst. As a result, a high efficiency of contact with the reactants and high catalytic activity can be obtained. On the other hand, by regulating the total pore volume to 0.5 mL/g or less, a high side crush strength can be obtained, which is practically preferred.

The specific surface area and total pore volume described above can be measured/calculated by the nitrogen adsorption method using an ordinary apparatus for surface area and pore volume measurement.

The catalyst obtained by the processes of the present invention should have a side crush strength of 0.3 kg/2 mm or higher after the stabilization by calcination. By regulating the side crush strength to 0.3 kg/2 mm or higher, the catalyst can be prevented from being destroyed by its own weight when packed into a practical apparatus. Usually, the side crush strength is desirably 0.5 kg/2 mm or higher. The side crush strength is preferably 5.0 kg/2 mm or lower. By regulating the side crush strength to 5.0 kg/2 mm or lower, a catalyst can be obtained which has a large specific surface area, a large pore volume, and a sufficiently large number of active sites necessary for reactions and which, as a result, has high activity.

Method of Hydrodesulfurization and Isomerization:

A light hydrocarbon oil containing organosulfur, such as a light naphtha taken through atmospheric distillation equipment of the crude-oil, a light naphtha separated from a whole naphtha likewise taken through atmospheric distillation equipment of the crude-oil, or a Merox sweetening naphtha obtained by subjecting a light naphtha to the Merox sweetening treatment, is preferred as the feedstock oil to be treated by the method in which hydrocarbons are desulfurized and simultaneously isomerized with the catalyst of the present invention. An especially suitable feedstock oil is a light naphtha having an ASTM distillation temperature of from 25 to 130° C., preferably from 25 to 110° C.

With respect to the content of organosulfur, a light naphtha having an organosulfur content of 700 ppm by weight or lower, preferably about from 10 to 500 ppm by weight, more preferably about from 10 to 200 ppm by weight, can be advantageously used. It is a matter of course that a light hydrocarbon oil having a sulfur content of several ppm or lower can also be used as a feedstock oil.

Examples of Organosulfur Compound:

Typical examples of the organosulfur compound contained in light naphthas include thiol compounds (R—SH; hereinafter R represents a hydrocarbon group) such as 2-propanethiol, $(CH_3)_2CH$—SH, and ethanethiol, $C_2H_5$—SH, sulfide compounds (R—S—R) such as methyl ethyl sulfide, $CH_3$—S—$C_2H_5$, disulfide compounds (R—SS—R) such as ethyl isopropyl disulfide, $C_2H_5$—SS—$CH(CH_3)_2$, and the like. With the catalyst of the present invention, these organosulfur compounds can be hydrodesulfurized simultaneously with feedstock oil isomerization, whereby desulfurization is realized.

Other Components of the Feedstock Oil:

From the standpoint of maintaining the catalytic activity over a longer period, it is preferred that the amounts of aromatics, unsaturated hydrocarbons, and higher hydrocarbons containing in the light naphtha to be used as a feedstock be small. The amount of benzene is preferably 5% by volume or smaller, more preferably 3% by volume or smaller. The amount of naphthenes is preferably 12% by volume or smaller, more preferably 9% by volume or smaller. That of C7 compounds is preferably 15% by volume or smaller, more preferably 10% by volume or smaller.

Reaction Conditions:

Conditions for the hydrodesulfurization and isomerization in the present invention are as follows:

Reaction Temperature:
160–240° C., preferably 180–220° C.

Reaction Pressure:
1.0–4.5 MPa, preferably 1.4–3.5 MPa

LHSV: 1.0–10 $h^{-1}$, preferably 1.0–5 $h^{-1}$

Hydrogen/Oil Ratio:
100–1,000 NL/L, preferably 150–800 NL/L

By using a reaction temperature of 160° C. or higher, the catalyst life is prolonged. On the other hand, by using a temperature of 240° C. or lower, the light hydrocarbon oil is prevented from decomposing and the yield of the product oil can be heightened. The other conditions, i.e., reaction pressure, LHSV, and hydrogen/oil ratio, are almost the same as the conditions for the isomerizations of light hydrocarbon oils which have been conducted hitherto.

The catalyst of the present invention can be used in place of isomerization catalysts heretofore in use, whereby not isomerization alone but hydrodesulfurization and isomerization can be simultaneously conducted. Namely, the organosulfur compounds contained in the light hydrocarbon oil can be hydrodesulfurized into hydrogen sulfide to reduce the sulfur content to several ppm or lower and, simultaneously therewith, hydrocarbons can be directly isomerized. Thus, a product oil containing no sulfur and having an improved octane number can be obtained.

The catalysts produced by the processes according to the present invention have a high side crush strength even when the amount of the binder incorporated therein is small. Because of this, the catalysts are easy to handle and there is no fear that they may be destroyed by their own weight when packed into a fixed-bed reactor. The catalysts hence have the high value of industrial utilization. The catalysts as solid acid catalysts have high catalytic activity and can be used also for the isomerization of sulfur-containing naphthas as shown in the Examples. The catalysts are exceedingly effective in practical use.

The present invention will be explained below by reference to Examples, but the present invention should not be construed as being limited to these Examples.

EXAMPLE 1

(1) Production of $SO_4/Zr(OH)_4$

To 4,000 g of 1 N sulfuric acid was added 400 g of a zirconium hydroxide, $Zr(OH)_4$, followed by stirring for 30 minutes. After the stirring, the mixture was filtered and the solid obtained was dried at 110° C. for overnight to obtain 452 g of a sulfate group-containing zirconium hydroxide, $SO_4/Zr(OH)_4$.

(2) Catalyst Molding

After 357 g of the sulfate group-containing zirconium hydroxide was sufficiently mixed with 47.5 g of pseudoboehmite (manufactured by Catalysts & Chemicals Co., Ltd.; the same applies hereinafter), 200 g of an aqueous solution containing 4.74 g of tetraamminedichloropalladium, $[Pd(NH_3)_4].Cl_2.H_2O$, dissolved therein was added to the mixture, followed by kneading. The kneaded mixture was extruded through an opening having a diameter of 1.8 mm, and the extrudate was dried at 110° C. for 2 hours to obtain 420 g of a molded form of $Pd/SO_4/Zr(OH)_4$—$Al_2O_3$.

(3) Calcination and Stabilization of Molded Form

The molded form thus obtained was calcined in a muffle furnace at 600° C. for 3 hours to obtain 335 g of a catalyst A, i.e., $Pd/SO_4/ZrO_2$—$Al_2O_3$, as a final product.

EXAMPLE 2

(1) Production of $SO_4/Zr(OH)_4$

To 4,000 g of 1 N sulfuric acid was added 400 g of a zirconium hydroxide, $Zr(OH)_4$, followed by stirring for 30 minutes. After the stirring, the mixture was filtered and the solid obtained was dried at 110° C. for overnight to obtain 452 g of a sulfate group-containing zirconium hydroxide, $SO_4/Zr(OH)_4$.

(2) Production of $Pd/SO_4/Zr(OH)_4$

To a solution prepared by dissolving 3.8 g of palladium chloride in hydrochloric acid was added 380 g of the sulfate group-containing zirconium hydroxide. The zirconium hydroxide was thus impregnated with the palladium salt. Thereafter, the impregnated palladium hydroxide was dried at 110° C. for overnight to obtain 382 g of a zirconium hydroxide having loaded thereon palladium and containing a sulfate group, $Pd/SO_4/Zr(OH)_4$.

(3) Catalyst Molding

After 357 g of the zirconium hydroxide having loaded thereon palladium and containing a sulfate group was sufficiently mixed with 47.5 g of pseudoboehmite, 200 g of water was added to the mixture, followed by kneading. The kneaded mixture was extruded through an opening having a diameter of 1.8 mm, and the extrudate was dried at 110° C. for 2 hours to obtain 420 g of a molded form of $Pd/SO_4/Zr(OH)_4$—$Al_2O_3$.

(4) Calcination and Stabilization of Molded Form

The molded form thus obtained was calcined in a muffle furnace at 600° C. for 3 hours to obtain 335 g of a catalyst B, i.e., $Pd/SO_4/ZrO_2$—$Al_2O_3$, as a final product.

EXAMPLE 3

(1) Production of $Pd.Pt/SO_4/Zr(OH_4)$

To an aqueous solution containing 7.11 g of tetraamminedichloropalladium, $[Pd(NH_3)_4].Cl_2.H_2O$, 2.04 g of tetraamminedichloroplatinum, $[Pt(NH_3)_4].Cl_2.H_2O$, and 60.2 g of ammonium sulfate, $(NH_4)_2SO_4$, dissolved therein was added 450 g of a zirconium hydroxide, $Zr(OH)_4$. The zirconium hydroxide was thus impregnated with the palladium salt and platinum salt and with sulfur. Thereafter, the impregnated zirconium hydroxide was dried at 110° C. for overnight to obtain 469 g of a zirconium hydroxide having loaded thereon palladium/platinum and containing a sulfate group, $Pd.Pt/SO_4/Zr(OH)_4$.

(2) Catalyst Molding

After 357 g of the zirconium hydroxide having loaded thereon palladium/platinum and containing a sulfate group, $Pd.Pt/SO_4/Zr(OH)_4$, was sufficiently mixed with 47.5 g of pseudoboehmite, 200 g of water was added thereto, followed by kneading, and the kneaded mixture was extruded through an opening having a diameter of 1.8 mm. The extrudate was dried at 110° C. for 2 hours to thereby obtain 420 g of a molded form of $Pd.Pt/SO_4/Zr(OH)_4$—$Al_2O_3$.

(3) Calcination and Stabilization of Molded Form

The molded form thus obtained was calcined in a muffle furnace at 600° C. for 3 hours to obtain 336 g of a catalyst C, i.e., $Pd.Pt/SO_4/ZrO_2$—$Al_2O_3$, as a final product.

EXAMPLE 4

The procedure of Example 1 was repeated, except that in the step of catalyst molding, the amount of the sulfate group-containing zirconium hydroxide was changed to 377 g and the amount of the pseudoboehmite was changed to 23.5 g and that in the step of calcination and stabilization of molded form, the calcining temperature was changed to 550° C. As a result, 335 g of a catalyst D, i.e., $Pd/SO_4/ZrO_2$—$Al_2O_3$, was obtained as a final product.

EXAMPLE 5

The procedure of Example 1 was repeated, except that in the step of catalyst molding, the amounts of the sulfate group-containing zirconium hydroxide and the pseudoboehmite were changed to 319 g and 94.0 g, respectively, and that in the step of calcination and stabilization of molded form, the calcining temperature was changed to 800° C. As a result, 337 g of a catalyst E, i.e., $Pd/SO_4/ZrO_2$—$Al_2O_3$, was obtained as a final product.

EXAMPLE 6

(1) Production of $SO_4/ZrO(OH)_2$

To 4,000 g of 1 N sulfuric acid was added 400 g of a partially oxidized zirconium hydroxide, $ZrO(OH)_2$, followed by stirring for 30 minutes. After the stirring, the mixture was filtered and the solid obtained was dried at 110° C. for overnight to obtain 435 g of a partially oxidized sulfate group-containing zirconium hydroxide, $SO_4/ZrO(OH)_2$.

(2) Catalyst Molding

After 347 g of the partially oxidized sulfate group-containing zirconium hydroxide was sufficiently mixed with 47.5 g of pseudoboehmite, 200 g of an aqueous solution containing 4.74 g of tetraamminedichloropalladium dissolved therein was added thereto, followed by kneading. The kneaded mixture was extruded through an opening having a diameter of 1.8 mm, and the extrudate was dried at 110° C. for 2 hours to obtain 415 g of a molded form of $Pd/SO_4/ZrO(OH)_2$—$Al_2O_3$.

(3) Calcination and Stabilization of Molded Form

The molded form thus obtained was calcined in a muffle furnace at 600° C. for 3 hours to obtain 333 g of a catalyst F, i.e., Pd/SO$_4$/ZrO$_2$—Al$_2$O$_3$, as a final product.

Comparative Example 1

A step of catalyst molding was conducted in the same manner as in Example 1, except that the sulfate group-containing zirconium hydroxide was calcined at 600° C. to convert it into zirconium oxide containing a sulfate group, SO$_4$/ZrO$_2$. The molded form was calcined and stabilized at 600° C. for 3 hours in the same manner to obtain 350 g of a catalyst G, i.e., Pd/SO$_4$/ZrO$_2$—Al$_2$O$_3$.

Comparative Example 2

A step of catalyst molding was conducted in the same manner as in Example 2, except that the zirconium hydroxide having loaded thereon palladium and containing a sulfate group was calcined at 600° C. to convert it into zirconium oxide having loaded thereon palladium and containing a sulfate group, Pd/SO$_4$/ZrO$_2$. The molded form was calcined and stabilized at 600° C. for 3 hours in the same manner to obtain 349 g of a catalyst H, i.e., Pd/SO$_4$/ZrO$_2$—Al$_2$O$_3$.

Comparative Example 3

(1) Catalyst Molding

After 310 g of zirconium oxide was sufficiently mixed with 47.5 g of pseudoboehmite, an aqueous solution containing 4.74 g of tetraamminedichloropalladium and 40.1 g of ammonium sulfate, (NH$_4$)$_2$SO$_4$, dissolved therein was added thereto, followed by kneading. The mixture kneaded was molded by extrusion through an opening having a diameter of 1.8 mm. The extrudate was dried at 110° C. for 2 hours to thereby obtain 380 g of a molded form of Pd/SO$_4$/ZrO$_2$—Al$_2$O$_3$.

(2) Calcination and Stabilization of Molded Form

The molded form thus obtained was calcined in a muffle furnace at 600° C. for 3 hours to obtain 336 g of a catalyst I, i.e., Pd/SO$_4$/ZrO$_2$—Al$_2$O$_3$, as a final product.

Comparative Example 4

A catalyst was produced in the same manner as in Example 1, except that in the step of calcination and stabilization of molded form, the burning temperature was changed to 500° C. Thus, 350 g of a catalyst J, i.e., Pd/SO$_4$/ZrO$_2$—Al$_2$O$_3$, was obtained.

Comparative Example 5

A catalyst was produced in the same manner as in Example 1, except that in the step of calcination and stabilization of molded form, the calcining temperature was changed to 900° C. Thus, 320 g of a catalyst K, i.e., Pd/SO$_4$/ZrO$_2$—Al$_2$O$_3$, was obtained.

Comparative Example 6

A catalyst was produced in the same manner as in Example 1, except that in the step of catalyst molding, 33.3 g of a fine powder of γ-alumina was used in place of the pseudoboehmite. Thus, 333 g of a catalyst L, i.e., Pd/SO$_4$/ZrO$_2$—Al$_2$O$_3$, was obtained.

Comparative Example 7

A catalyst was produced in the same manner as in Example 1, except that in the step of catalyst molding, 100 g of silica sol "SI-350" (manufactured by Catalysts & Chemicals Co., Ltd.) was used in place of the pseudoboehmite. Thus, 333 g of a catalyst M, i.e., Pd/SO$_4$/ZrO$_2$—Al$_2$O$_3$, was obtained.

Catalyst Property Test:

The catalysts produced in Examples 1 to 6 and Comparative Examples 1 to 7 given above were examined for specific surface area, pore volume, sulfur content, and side crush strength. For the measurements of specific surface area and pore volume was used high-precision automatic gas adsorption apparatus "BELSORP 28", manufactured by BEL JAPAN, INC. A sulfur content was measured with sulfur content analyzer "SC-132", manufactured by LECO Co., Ltd. The side crush strength of each catalyst was measured with a Kiya type hardness meter manufactured by Kiya Seisakusho. Twenty cylindrical molded-catalyst samples having a length of about 2 mm were selected and examined for the transverse-direction strength of the catalyst. The average of these was taken as the side crush strength.

Production conditions for the catalysts produced in Examples 1 to 6 and Comparative Examples 1 to 7 and the properties thereof are summarized in Table 1 (Examples) and Table 2 (Comparative Examples).

TABLE 1

|  | Example 1 | Example 2 | Example 3 |
|---|---|---|---|
| Catalyst | A | B | C |
| Molding material | SO$_4$/Zr(OH)$_4$ | Pd/SO$_4$/Zr(OH)$_4$ | Pd,Pt/SO$_4$/Zr(OH)$_4$ |
| Binder | pseudo-boehmite | pseudo-boehmite | pseudo-boehmite |
| Kneading liquid | aqueous Pd salt solution | water | water |
| Pd content (wt %) | 0.5 | 0.5 | 0.5 |
| Pt content (wt %) | — | — | 0.2 |
| Calcining conditions | 600° C. × 3 hr | 600° C. × 3 hr | 600° C. × 3 hr |
| Specific surface area (m$^2$/g) | 128 | 117 | 125 |
| Pore volume (ml/g) | 0.196 | 0.178 | 0.175 |
| Sulfur content (wt %) | 2.8 | 2.5 | 1.7 |
| Side crush strength (kg/2 mm) | 1.8 | 1.5 | 1.2 |
| Al$_2$O$_3$ content (wt %) | 10 | 10 | 10 |

|  | Example 4 | Example 5 | Example 6 |
|---|---|---|---|
| Catalyst | D | E | F |
| Molding material | SO$_4$/Zr(OH)$_4$ | SO$_4$/Zr(OH)$_4$ | SO$_4$/ZrO(OH)$_2$ |
| Binder | pseudo-boehmite | pseudo-boehmite | pseudo-boehmite |
| Kneading liquid | aqueous Pd salt solution | aqueous Pd salt solution | aqueous Pd salt solution |
| Pd content (wt %) | 0.5 | 0.5 | 0.5 |
| Pt content (wt %) | — | — | — |
| Calcining conditions | 550° C. × 3 hr | 800° C. × 3 hr | 600° C. × 3 hr |
| Specific surface area (m$^2$/g) | 135 | 120 | 140 |
| Pore volume (ml/g) | 0.150 | 0.330 | 0.160 |
| Sulfur content (wt %) | 3.0 | 0.5 | 0.5 |
| Side crush strength (kg/2 mm) | 0.7 | 3.0 | 1.5 |
| Al$_2$O$_3$ content (wt %) | 5 | 20 | 10 |

TABLE 2

|  | Comp. Ex. 1 | Comp. Ex. 2 | Comp. Ex. 3 | Comp. Ex. 4 |
|---|---|---|---|---|
| Catalyst | G | H | I | J |
| Molding material | $SO_4/ZrO_2$ | $Pd/SO_4/ZrO_2$ | $ZrO_2$ | $SO_4/Zr(OH)_4$ |
| Binder | pseudo-boehmite | pseudo-boehmite | pseudo-boehmite | pseudo-boehmite |
| Kneading liquid | aqueous Pd salt solution | water | aqueous solution of (Pd salt + ammonium sulfate) | aqueous Pd salt solution |
| Pd content (wt %) | 0.5 | 0.5 | 0.5 | 0.5 |
| Pt content (wt %) | — | — | — | — |
| Calcining conditions | 600° C. × 3 hr | 600° C. × 3 hr | 800° C. × 3 hr | 500° C. × 3 hr |
| Specific surface area ($m^2/g$) | 110 | 101 | 67 | 115 |
| Pore volume (ml/g) | 0.101 | 0.087 | 0.054 | 0.135 |
| Sulfur content (wt %) | 2.0 | 2.1 | 2.8 | 4.5 |
| Side crush strength (kg/2 mm) | 3.3 | 3.5 | 0.1 | 1.2 |
| $Al_2O_3$ content (wt %) | 10 | 10 | 10 | 10 |

|  | Comp. Ex. 5 | Comp. Ex. 6 | Comp. Ex. 7 |
|---|---|---|---|
| Catalyst | K | L | M |
| Molding material | $SO_4/Zr(OH)_4$ | $SO_4/Zr(OH)_4$ | $SO_4/Zr(OH)_4$ |
| Binder | pseudoboehmite | $\gamma$-$Al_2O_3$ | $SiO_2$ sol |
| Kneading liquid | aqueous Pd salt solution | aqueous Pd salt solution | aqueous Pd salt solution |
| Pd content (wt %) | 0.5 | 0.5 | 0.5 |
| Pt content (wt %) | — | — | — |
| Calcining conditions | 900° C. × 3 hr | 600° C. × 3 hr | 600° C. × 3 hr |
| Specific surface area ($m^2/g$) | 56 | 105 | 89 |
| Pore volume (ml/g) | 0.270 | 0.511 | 0.453 |
| Sulfur content (wt %) | 0.1 | 1.3 | 1.0 |
| Side crush strength (kg/2 mm) | 1.2 | 0.1 | 0.1 |
| $Al_2O_3$ content (wt %) | 10 | 10 | 10 |

The data on catalyst properties given above show that the catalysts produced by processes outside the scope of the present invention, i.e., the catalysts of Comparative Examples 3, 6, and 7, have a side crush strength as low as about 0.1 kg/2 mm and are unsuitable for practical use.

Examples of Catalyst Use:

Each catalyst was packed into a fixed-bed flow-through type reactor having a catalyst packing capacity of 7 ml. A light naphtha from a simplified desulfurizer (Merox) was fed thereto as a feedstock hydrocarbon oil to conduct isomerization. Reaction conditions are as follows.

Sulfur concentration in the light naphtha: 160 wt ppm
i-C5 ratio in the light naphtha: 41%
Reaction temperature: 200° C.
Hydrogen pressure in reaction: 3.0 MPa
LHSV: 1.5/h$^{-1}$
Hydrogen/oil ratio: 350 NL/L At 150 hours after the reaction start, the oil taken at the outlet from the reactor was analyzed for composition by gas chromatography. The results are shown in Table 3. The "C5 isomer ratio" in Table 3 is defined by the following equation.

TABLE 3

$$\text{C5 isomer ratio (\%)} = \frac{\text{Content of i-C5 component in product oil, wt \%}}{\text{Content of all C5 components in product oil, wt \%}} \times 100$$

| Catalyst | Example | C5 isomer ratio (%) |
|---|---|---|
| A | Example 1 | 63 |
| B | Example 2 | 62 |
| C | Example 3 | 67 |
| D | Example 4 | 58 |
| E | Example 5 | 56 |
| F | Example 6 | 61 |
| G | Comparative Example 1 | 48 |
| H | Comparative Example 2 | 45 |
| I | Comparative Example 3 | 43 |
| J | Comparative Example 4 | 41 |
| K | Comparative Example 5 | 45 |
| L | Comparative Example 6 | 47 |
| M | Comparative Example 7 | 43 |

The data given in Table 3 show that when the catalysts produced according to the processes of the present invention, i.e., the catalysts of Examples 1 to 6, are used to conduct isomerization, which is a representative reaction for solid acid catalysts, then the C5 isomer ratio in the product oil reaches 56% or higher. It can be seen that they are excellent solid acid catalysts. In each of Comparative Examples 1 and 2, in which sulfuric acid-containing zirconium oxide was used and which were outside the scope of the present invention, and Comparative Examples 4 and 5, in which the calcining conditions were not satisfied, the C5 isomer ratio is 50% or below and is lower than in the Examples.

In the reactions using the catalysts A to F of Examples 1 to 6, all the organosulfur compounds in the feedstock oil were hydrogenated into hydrogen sulfide. Although the hydrogen sulfide yielded was dissolved in the product oil in the saturation amount, the components of the product oil had an organosulfur compound concentration of 0 ppm.

While the invention has been described in detail and with reference to specific embodiments thereof, it will be apparent to one skill in the art that various changes and modifications can be made therein without departing from the spirit and scope thereof. All references cited herein are incorporated in their entirety.

What is claimed is:

1. A process for producing a solid acid catalyst, which comprises:
   (A) subjecting a zirconium hydroxide to a sulfation treatment by adding a sulfate group-containing substance;
   ($B_1$) adding a pseudoboehmite as a binder to the sulfated zirconium hydroxide, followed by kneading with an aqueous solution containing at least one metal of the Group VIII;
   (C) molding the resulting kneaded mixture; and
   (D) calcining the resulting molding at a temperature of from 550 to 800° C.

2. A solid acid catalyst, which is produced by the process according to claim 1, and has a specific surface area of from 50 to 200 $m^2$/g, a total pore volume of from 0.05 to 0.5 mL/g, and a side crush strength of 0.3 kg/2 mm or higher.

3. The solid acid catalyst according to claim 2, which has a specific surface area of from 60 to 180 $m^2$/g, a total pore volume of from 0.1 to 0.4 mL/g, and a side crush strength of 0.5 kg/2 mm or higher.

4. A process for producing a solid acid catalyst, which comprises;
   (A) subjecting a zirconium hydroxide to a sulfation treatment by adding a sulfate group-containing substance;
   ($B_2$) loading at least one metal of the Group VIII on the sulfated zirconium hydroxide, and then adding a pseudoboehmite as a binder thereto, followed by kneading with water;
   (C) molding the resulting kneaded mixture; and
   (D) calcining the resulting molding at a temperature of from 550 to 800° C.

5. A solid acid catalyst, which is produced by the process according to claim 4, and has a specific surface area of from 50 to 200 $m^2$/g, a total pore volume of from 0.05 to 0.5 mL/g, and a side crush strength of 0.3 kg/2 mm or higher.

6. The solid acid catalyst according to claim 5, which has a specific surface area of from 60 to 180 $m^2$/g, a total pore volume of from 0.1 to 0.4 mL/g, and a side crush strength of 0.5 kg/2 mm or higher.

* * * * *